(12) United States Patent
Delobel et al.

(10) Patent No.: US 10,023,067 B2
(45) Date of Patent: Jul. 17, 2018

(54) METHOD AND SYSTEM FOR CHARGING A MOTOR VEHICLE BATTERY ACCORDING TO TEMPERATURE

(71) Applicant: RENAULT s.a.s., Boulogne-Billancourt (FR)

(72) Inventors: Bruno Delobel, Issy les Moulineaux (FR); Julien Marie, Sceaux (FR); Anais Ricaud, Guyancourt (FR); Juan-Pablo Soulier, Paris (FR); Laureline Marchal, Guyancourt (FR)

(73) Assignee: RENAULT s.a.s, Boulogne-Billancourt (FR)

( * ) Notice: Subject to any disclaimer, the term of this patent is extended or adjusted under 35 U.S.C. 154(b) by 0 days.

(21) Appl. No.: 15/867,271

(22) Filed: Jan. 10, 2018

(65) Prior Publication Data
US 2018/0126863 A1   May 10, 2018

Related U.S. Application Data

(63) Continuation of application No. 14/787,364, filed as application No. PCT/FR2014/051014 on Apr. 28, 2014, now abandoned.

(30) Foreign Application Priority Data

Apr. 29, 2013  (FR) ..................... 13 53914

(51) Int. Cl.
*H02J 7/04* (2006.01)
*H02J 7/16* (2006.01)
(Continued)

(52) U.S. Cl.
CPC ....... *B60L 11/1861* (2013.01); *B60L 11/1838* (2013.01); *H01M 10/44* (2013.01);
(Continued)

(58) Field of Classification Search
CPC . B60L 11/1861; B60L 11/1838; H01M 10/48; H01M 10/44; H01M 10/443;
(Continued)

(56) References Cited

U.S. PATENT DOCUMENTS

2002/0120906 A1   8/2002  Xia et al.
2009/0066295 A1*  3/2009  Takeno .................. H02J 7/0093
                                                    320/145

(Continued)

FOREIGN PATENT DOCUMENTS

JP   2001-037093 A   2/2001
WO   WO 2012/156401 A1   11/2012

OTHER PUBLICATIONS

International Search Report dated Sep. 30, 2014, in PCT/FR2014/051014 filed Apr. 28, 2014.
(Continued)

*Primary Examiner* — Nha Nguyen
(74) *Attorney, Agent, or Firm* — Oblon, McClelland, Maier & Neustadt, L.L.P.

(57) ABSTRACT

A method for charging a motor vehicle battery includes determining the electrolyte resistance frequency of the cell, determining the battery charge transfer resistance frequency, and charging the battery with a current at a charging current frequency greater than the electrolyte resistance frequency of the battery and less than the battery charge transfer resistance frequency.

9 Claims, 6 Drawing Sheets

(51) Int. Cl.
　　　*B60L 11/18*　　　(2006.01)
　　　*H02J 7/00*　　　(2006.01)
　　　*H01M 10/44*　　　(2006.01)
　　　*H01M 10/48*　　　(2006.01)

(52) U.S. Cl.
　　　CPC ......... *H01M 10/443* (2013.01); *H01M 10/48* (2013.01); *H02J 7/0003* (2013.01); *H02J 7/007* (2013.01); *H02J 7/0052* (2013.01); *H01M 2220/20* (2013.01)

(58) Field of Classification Search
　　　CPC .... H01M 2220/20; H02J 7/0052; H02J 7/007; H02J 7/0003; H02J 7/0093; G01R 31/3651; G01R 31/3662
　　　See application file for complete search history.

(56) References Cited

U.S. PATENT DOCUMENTS

| | | |
|---|---|---|
| 2010/0277128 A1 | 11/2010 | Tam et al. |
| 2013/0076313 A1 | 3/2013 | Kim et al. |
| 2014/0070820 A1 | 3/2014 | Depernet et al. |

OTHER PUBLICATIONS

Li, J. et al. "The effects of pulse charging on cycling characteristics of commercial lithium-ion batteries", Journal of Power Sources, vol. 102, No. 1-2, (Dec. 1, 2001), pp. 302-309, XP004331050.
French Search Report dated Feb. 4, 2014, in French Application 1353914 filed Apr. 29, 2013.

\* cited by examiner

METHOD AND SYSTEM FOR CHARGING A MOTOR VEHICLE BATTERY ACCORDING TO TEMPERATURE

BACKGROUND

The technical field of the invention is the control of charging of batteries of a motor vehicle, and more particularly the charging of such batteries at low temperatures.

The performance of a battery power, energy, durability) is very sensitive to operating temperature. At low temperature, the battery has less power, delivers less energy and is subject to degradation during charging, while at high temperature the battery has optimum performance in terms of power and energy.

The following documents are known from the prior art.

Patent application JP2001037093A discloses the use of a charge current oscillating at a frequency between 103 Hz and a few hundred Hz, with an amplitude of a few mV.

This teaching cannot be applied to Li-Ion batteries insofar as the specified frequency of 1 kHz is too high. In fact this frequency corresponds to the inductive part of the impedance spectrum, or the impedance of the metal parts (i.e. current collector) and electronic conductive compounds (i.e. conductive carbon). Furthermore, this patent application mainly describes the improvement at a constant voltage with a voltage oscillation of the order of a few mV, which improves the storage performance of the cell.

Document U.S. Pat. No. 7,227,336B1 determines the charging frequency of a battery from a diffusion coefficient.

Documents FR2943188, FR2964510 and FR2974253 disclose modulation of the battery charge current. However these documents do not provide any information concerning the effect of temperature on the choice of this frequency.

There is therefore a need for a system and a method for charging at low temperature which are optimized to reduce the charging time and the degradation of the battery during charging.

BRIEF SUMMARY

An object of the invention is a method for charging a motor vehicle battery, during which the following steps are used:
  determining the electrolyte resistance frequency of the battery,
  determining the charge transfer resistance frequency of the battery, and
  charging the battery with a current with a charge current frequency which is higher than the battery electrolyte resistance frequency and lower than the battery charge transfer resistance frequency.

From a complex representation of the impedance as a function of the charge current frequency, the electrolyte resistance frequency can be determined as the impedance frequency with a zero value of its imaginary part and the lowest value of the actual part, and the charge transfer resistance frequency as the impedance frequency with a minimal value of its imaginary part and the highest value of the actual part.

From a representation of the impedance as a function of the charge current phase shift, the electrolyte resistance frequency can be determined as the frequency for which the phase shift is cancelled out, and the charge transfer resistance frequency as the frequency for which the derivative of the phase shift as a function of frequency is cancelled out.

From a representation of the imaginary part over the cell impedance as a function of the charge current frequency, the electrolyte resistance frequency can be determined as the frequency for which the imaginary part is cancelled out, and the charge transfer resistance frequency as a frequency for which the derivative of the imaginary part as a function of frequency is cancelled out.

The charge current frequency may lie between 10 Hz and 300 Hz, preferably equal to 100 Hz.

New battery electrolyte resistance and battery charge transfer resistance frequencies may be determined when the temperature changes.

Another object of the invention is a system for charging a motor vehicle battery, comprising
  a means for determining the electrolyte resistance frequency of the battery,
  a means for determining the charge transfer resistance frequency of the battery, and
  a means for controlling the battery charge current and able to control the battery charging by a current with a frequency which is higher than the battery electrolyte resistance frequency and lower than the battery charge transfer resistance frequency.

The system may comprise a means for adjusting the charge current frequency as a function of the battery temperature, the adjustment means being able to control the determination means such that the battery electrolyte resistance frequency and the battery charge transfer resistance frequency are determined again when the temperature changes.

The means for determining the battery electrolyte resistance frequency and the means for determining the battery charge transfer resistance frequency may each comprise a map of the charge current frequency as a function of temperature.

The means for determining the battery electrolyte resistance frequency and the means for determining the battery charge transfer resistance frequency may each comprise a battery impedance spectrography device.

BRIEF DESCRIPTION OF THE DRAWINGS

Further aims, characteristics and advantages will become apparent from reading the following description, given solely as a non-limitative example with reference to the attached drawings, on which.

DETAILED DESCRIPTION

The method for controlling the battery charging allows an improvement in the battery charging at low temperature. The principle is based on the use of impedance spectroscopy to estimate the charge current frequency to be applied.

An impedance spectroscopy may be performed either on board the vehicle using the method described in the prior art (Impedance Spectroscopy by Voltage-Step Chronoamperometry Using the Laplace Transform Method in a Lithium-Ion Battery, Journal of The Electrochemical Society, 147 (3) 922-929 (2000)) or in advance using an impedance measurement. Firstly, the impedance spectroscopy consists of varying the battery charge current frequency while measuring the impedance of said battery. This gives a variation in battery impedance as a function of frequency.

In one case, the impedance spectroscopy performed on board allows determination of the charging frequency.

In another case, the charging frequency to be used is determined and set at the time of design of the charging system, in order to improve the battery charging under particular conditions.

In all cases, the charging frequency is determined from the impedance spectrum.

The charging frequency to be used is determined from the impedance spectrum.

Figure 1:
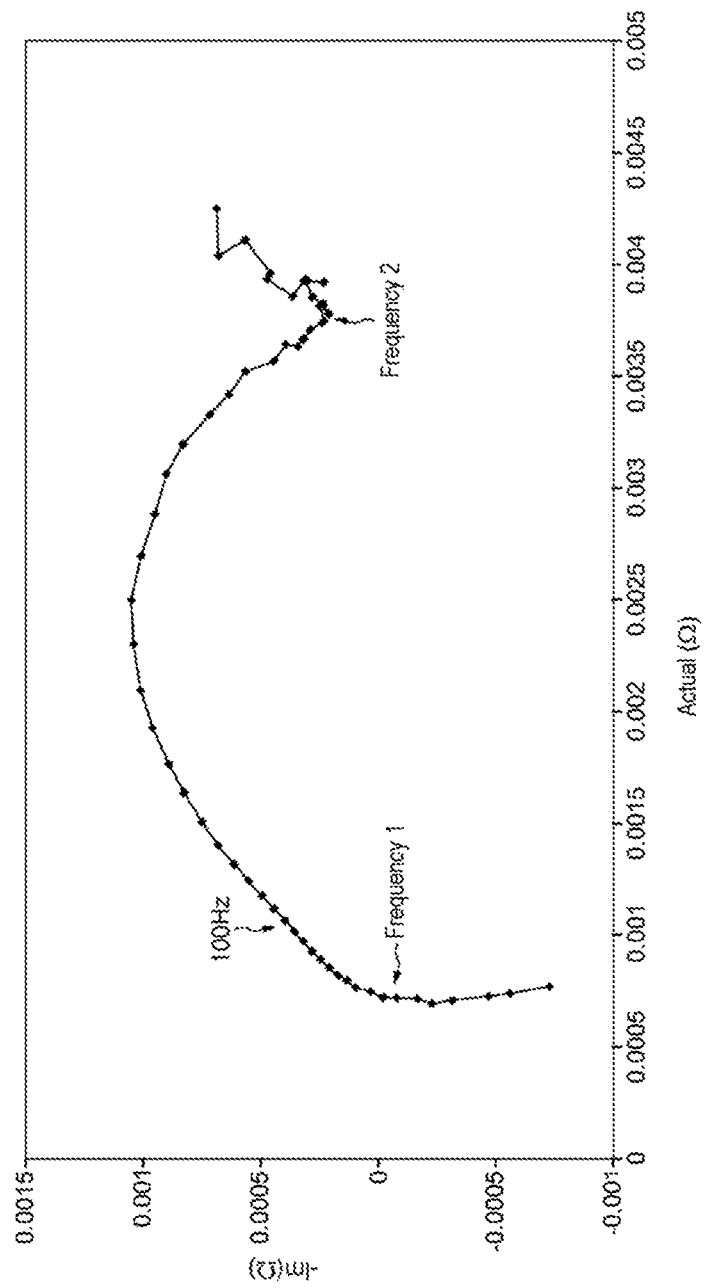
FIG. 1 shows a representation of the impedance in the complex space as a function of frequency.

FIG. 1 is a representation of the impedance in the complex space as a function of frequency. In other words, FIG. 1 shows a set of points, the coordinates of which are the imaginary part and the actual part of the impedance, each point representing a different frequency of the charge current.

FIG. 1 also illustrates the variation in impedance of the battery cell at a temperature of 0°.

On such a representation, we can identify two points corresponding to characteristic battery charging frequencies.

The first characteristic point corresponds to an impedance for which the imaginary part is zero. It is identified on FIG. 1 by the reference "Frequency 1" and, in the case illustrated by FIG. 1, corresponds to a frequency of 0.9 kHz. The frequency associated with this point will be referred to below as the electrolyte resistance frequency.

The second characteristic point corresponds to an impedance for which the imaginary part is minimal for an actual part which is greater than the actual part of the impedance associated with the first characteristic point. It is identified on FIG. 1 by the reference "Frequency 2" and, in the case illustrated in FIG. 1, corresponds to a frequency of 0.15 Hz. The frequency associated with this point will be referred to below as the charge transfer resistance frequency.

Figure 2:
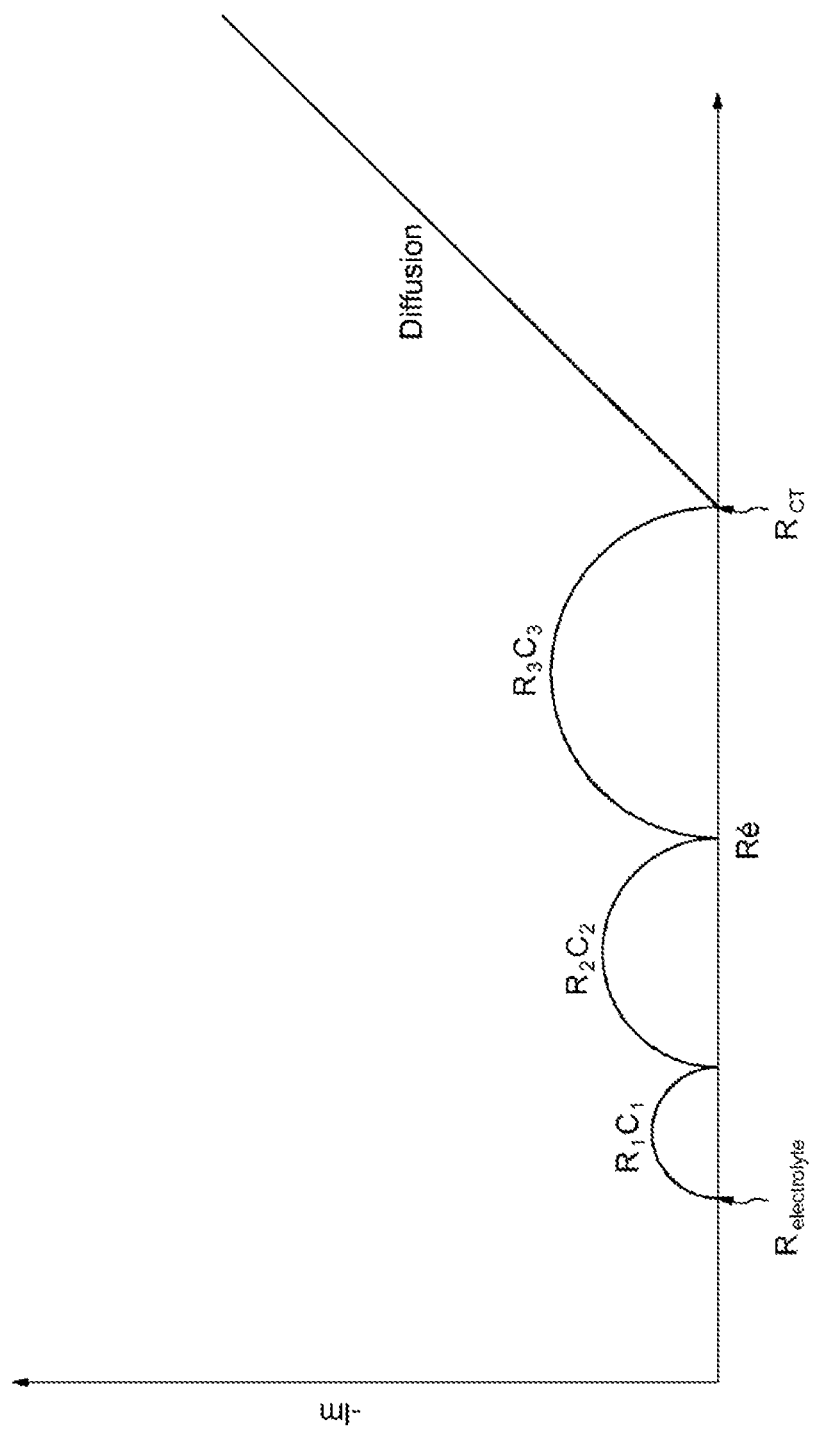
FIG. 2 shows diagrammatically the impedance in the complex space as a function of frequency.

In general, when the impedance frequency of a battery cell is sampled, successive minima of the imaginary part of the impedance are detected for increasing values of the actual part of the impedance. FIG. 2 illustrates such an impedance development diagrammatically.

The first minimum of the imaginary part of the impedance corresponds to the impedance associated with the electrolyte resistance frequency (i.e. Reiectrolyte).

The last minimum before the diffusion zone corresponds to an impedance associated with the charge transfer resistance frequency RCT. We note that the impedance of the charge transfer resistance is linked by the following equation to the impedance associated with the electrolyte resistance frequency and to the impedances of the other minima (marked Ri, R2 and R3)

$$Reiectrolyte + Ri + R2 + R3RCT$$

In the case of an Li-Ion battery, Ri may be considered as the resistance of the SEI (solid electrolyte interphase), $R_2$ may be the charge transfer resistance of the positive electrode, and $R_3$ may be the charge transfer resistance of the negative electrode (FIG. 2). It is possible to consider there to be a greater number of RC circuits in series. Thus the charge transfer resistance frequency RCT will be the sum of these various contributions. From another aspect, the charge transfer resistance frequency RCT could be regarded as the frequency just before the diffusion phenomena, characterized by the diffusion zone more commonly known as the Warburg zone or Warburg line (FIG. 2).

Figure 3:
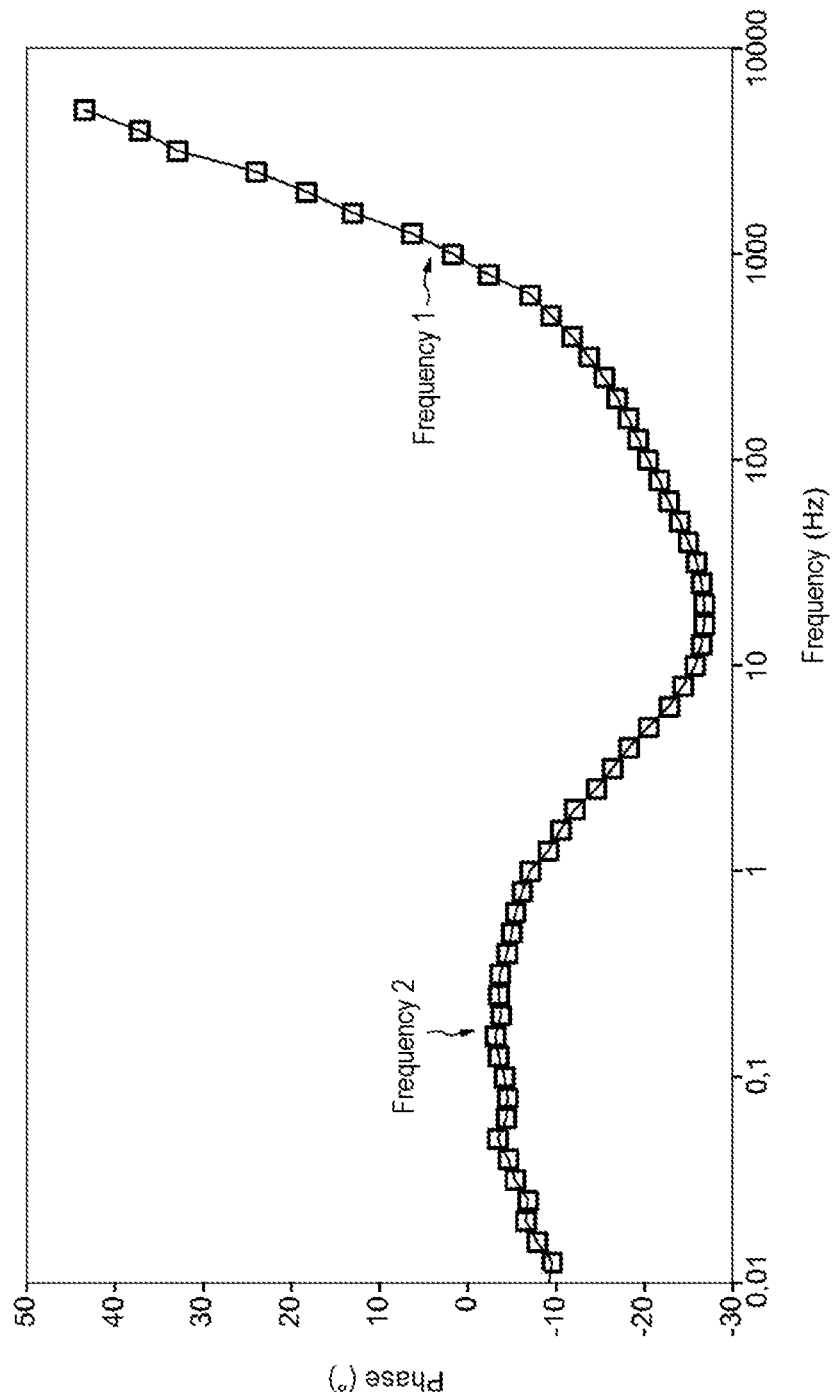
FIG. 3 shows a representation of the impedance as a function of the phase shift.

Alternatively, the electrolyte resistance frequency and the charge transfer resistance frequency may be determined as a function of the phase shift of the voltage at the impedance terminals relative to the current circulating between the impedance terminals. FIG. 3 shows a representation of the impedance as a function of the phase shift. From such a representation, the electrolyte resistance frequency is determined as the frequency for which the phase shift is cancelled out, and the charge transfer resistance frequency as the frequency for which the derivative of the phase shift as a function of frequency is cancelled out.

Figure 4:
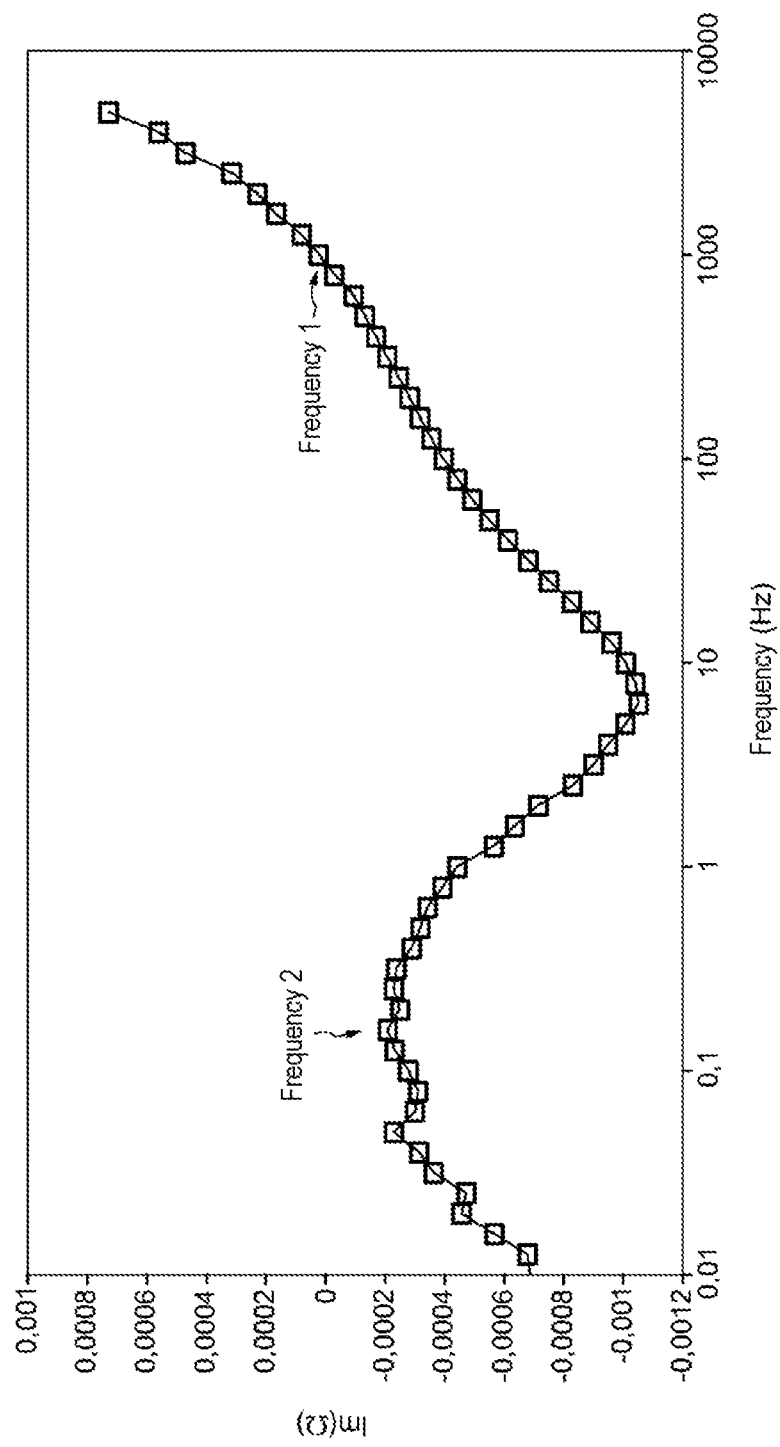
FIG. 4 shows a representation of the imaginary part over the cell impedance as a function of frequency.

Alternatively, the electrolyte resistance frequency and the charge transfer resistance frequency may be determined as a function of the contribution of the imaginary part over the cell impedance as a function of frequency. FIG. 4 depicts a representation of the imaginary part over the cell impedance as a function of frequency. From this representation, the electrolyte resistance frequency is determined as the frequency for which the imaginary part is cancelled out, and the charge transfer resistance frequency as the frequency for which the derivative of the imaginary part as a function of frequency is cancelled out.

However, the method must be implemented with minimum disruption to the voltage measurement allowing determination of the impedance. It is recalled that the impedance corresponds to the ratio of voltage over current at the terminals of the element measured. Thus the higher the impedance modulus at a given frequency, the more the voltage measurement will vary, making voltage measurement difficult. This must therefore be taken into account when selecting the frequency or frequency range to be used. Thus although the charge transfer resistance frequency is potentially usable, it has been found that this brings too great a risk of disrupting the voltage measurement. In contrast, the electrolyte resistance frequency has the lowest impedance modulus, but this high frequency may be difficult to control with power electronics. Similarly, the use of low frequencies may be harmful since power electronics requires switching at frequencies which may range from a few Hz to few kHz. Furthermore, the use of a high frequency will not be of great benefit since, at this frequency, only the electrolyte will be used, while it is more useful to mobilize the other parts of the cell for charging, such as the active material and more particularly the surface of active materials (i.e. the double layer capacitor).

Thus a current frequency is preferred which is higher that the electrolyte resistance frequency (Frequency 1) and lower than the charge transfer resistance frequency (Frequency 2).

Figure 5:
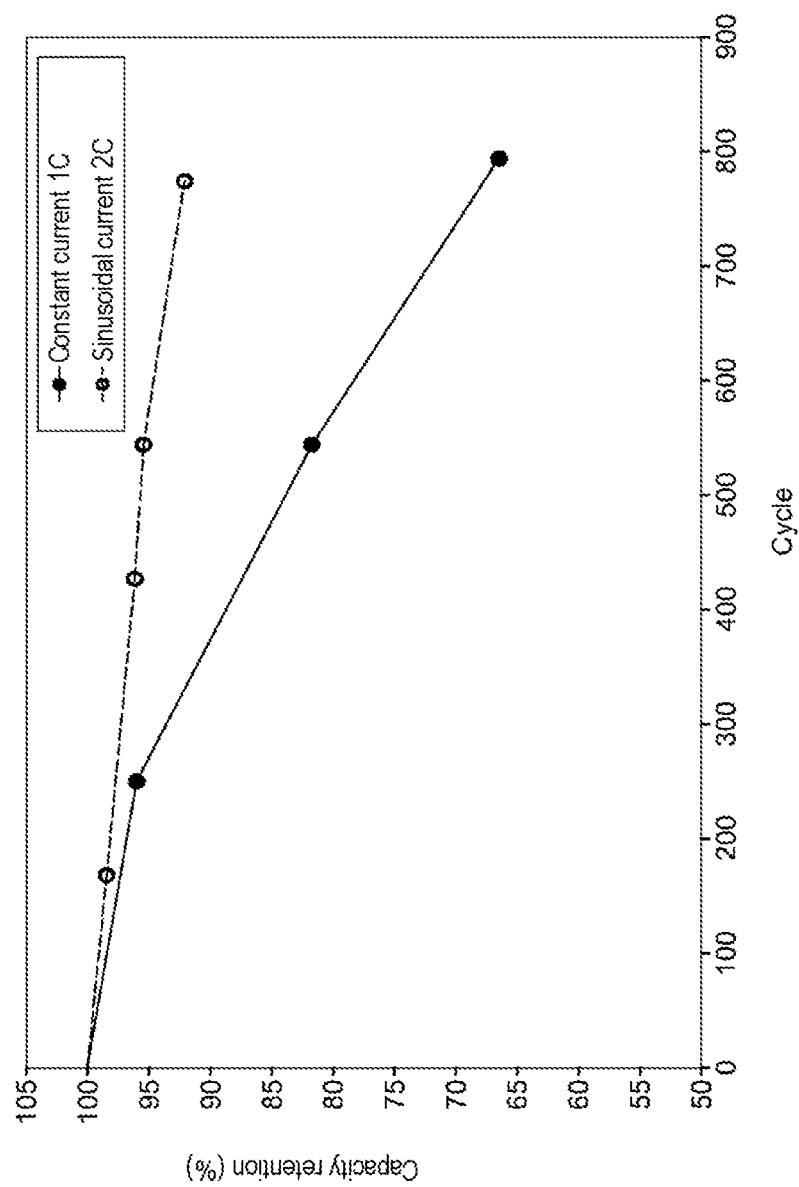
FIG. 5 shows the effects of a current with a frequency equal to 100 Hz on a battery cell.

FIG. 5 illustrates the effects of a current with frequency equal to 100 Hz on a battery cell.

Figure 6:
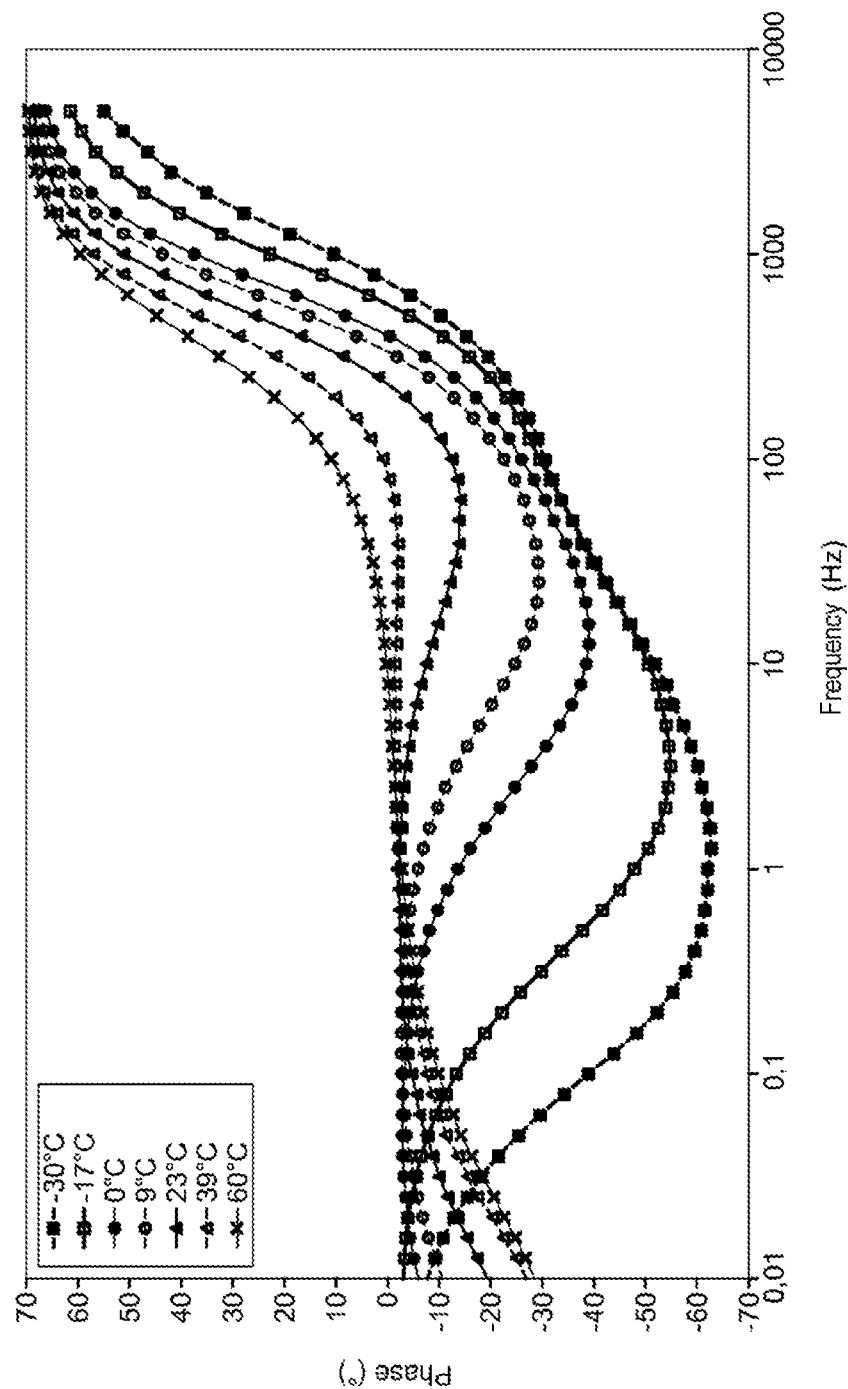
FIG. 6 shows the development of the phase shift as a function of frequency at different temperatures.

Brought to 0° C., a cell was tested by a reference current 10. Current 10 corresponds to the current required to discharge the cell in 1 hour. Another, similar cell was tested with a sinusoidal current of 2C peak to peak, for a mean current of 37 A, also at a temperature of 0° C. It appears that the use of a pulsed charge current has a beneficial effect on the capacity retention (i.e. its useful life). FIG. 6 illustrates the development of the phase shift as a function of frequency when the temperature varies. As can be seen, irrespective of battery temperature the general form of the spectrum and the determination of the characteristic frequencies remain the same. It is also clear that the frequency of the charge current develops between 10 Hz and 300 Hz when the temperature varies from 9° C. to −30° C.

The charging method also allows an improvement in the life of graphite-based Li-Ion batteries, and the performance of deeper charging. It has been found that a pulsed current allows a charging deeper by the order of 10% or more. This is reflected by a gain in autonomy of the battery. The depth of charge means the ability to store a greater or lesser quantity of energy (in Ah) for the same battery cell. The greater the quantity, the deeper the charge.

The charging method is applicable to graphite-based Li-Ion batteries with negative electrode, but also to Li-Ion batteries based on silicone (Si), germanium (Ge), tin (Sn), titanate in the form of $TiO_2$ or Li4TisO12, or ternary carbonated composites based on transition metals and tin. In these cases, the advantages may be an improvement in life, a shorter charging time, or an increase in battery autonomy (+10% capacity).

The charge current may be of the slot type, triangular, sinusoidal or other. However observation of the frequency setpoint takes priority over the current form. The charge current may have an offset such that it does not pass through a value of zero. It is however preferred to minimize the continuous current component.

The charging method allows application of a current with a periodicity in order to improve the life of the battery, to increase the depth of charge or to shorten the charging time, while using a higher mean charging power than when charging the battery with continuous current, for an identical degradation of the battery life.

It is thus possible to choose between a reduction in charging time and an improvement in life. At equivalent mean current or mean power, the life is improved by use of a periodic charging current. A charge with a mean power or mean current that is higher but periodic gives a degradation of the battery characteristics equivalent to that observed on charging with a continuous current.

The system for charging a motor vehicle battery comprises a means for determining the battery electrolyte resistance frequency and a means for determining the battery charge transfer resistance frequency, connected to a means for controlling the battery charge current.

The means for determining the battery electrolyte resistance frequency and the means for determining the battery charge transfer resistance frequency each comprise a battery impedance spectrography device or a map of frequency as a function of temperature. Alternately, the determination means may share a single spectrography device.

The means for controlling the battery charge current is able to control the battery charging by a current with a frequency which is higher than the battery electrolyte resistance frequency and lower than the battery charge transfer resistance frequency.

The charging system may also comprise a means for adjusting the charge current frequency as a function of battery temperature. The adjustment means is able to control the determination means such that the battery electrolyte resistance frequency and the battery charge transfer resistance frequency are determined again when the temperature changes. The new frequencies thus determined allow determination of a new charge current frequency.

The charging system may also be deactivated such that the battery charger functions with a continuous charge current.

The charging system and method therefore allow determination of the characteristic frequencies of the battery to be charged, and determination of the charge current frequency to be used. This determination is independent of the battery used and allows the effects of temperature to be taken into account so as to improve the charge and duration of life of the battery.

The invention claimed is:

1. A method for charging a motor vehicle battery, comprising:
   determining an electrolyte resistance frequency of the battery,
   determining a charge transfer resistance frequency of the battery,
   charging the battery with a current with a charge current frequency which is higher than the battery electrolyte resistance frequency and lower than the battery charge transfer resistance frequency, and
   adjusting the charge current frequency as a function of the battery temperature, the battery electrolyte resistance frequency and the battery charge transfer resistance frequency being determined again when the temperature changes.

2. The method as claimed in claim 1, wherein from a complex representation of impedance as a function of the charge current frequency, the electrolyte resistance frequency is determined as the impedance frequency with a zero value of an imaginary part and the lowest value of an actual part, and the charge transfer resistance frequency as the impedance frequency with a minimal value of the imaginary part and a highest value of the actual part.

3. The method as claimed in claim 1, wherein from a representation of impedance as a function of a charge current phase shift, the electrolyte resistance frequency is determined as the frequency for which the phase shift is cancelled out, and the charge transfer resistance frequency as the frequency for which a derivative of the phase shift as a function of frequency is cancelled out.

4. The method as claimed in claim 1, wherein from a representation of an imaginary part over a cell impedance as a function of the charge current frequency, the electrolyte resistance frequency is determined as the frequency for which an imaginary part is cancelled out, and the charge transfer resistance frequency as the frequency for which a derivative of the imaginary part as a function of frequency is cancelled out.

5. The method as claimed in claim 1, wherein the charge current frequency lies between 10 Hz and 300 Hz.

6. The method as claimed in claim 5, wherein the charge current frequency is equal to 100 Hz.

7. A system for charging a motor vehicle battery, comprising:
   means for determining an electrolyte resistance frequency of the battery,
   means for determining a charge transfer resistance frequency of the battery,
   means for controlling the battery charge current that controls the battery charging by a current with a frequency which is higher than the battery electrolyte resistance frequency and lower than the battery charge transfer resistance frequency, and
   means for adjusting the charge current frequency as a function of the battery temperature, the adjustment means controlling the determination means such that the battery electrolyte resistance frequency and the battery charge transfer resistance frequency are determined again when the temperature changes.

8. The system as claimed in claim 7, wherein the means for determining the battery electrolyte resistance frequency and the means for determining the battery charge transfer resistance frequency each comprise a map of the charge current frequency as a function of temperature.

9. The system as claimed in claim 7, wherein the means for determining the battery electrolyte resistance frequency and the means for determining the battery charge transfer resistance frequency each comprise a battery impedance spectrography device.

\* \* \* \* \*